United States Patent [19]

Wang et al.

[11] Patent Number: 5,632,554
[45] Date of Patent: May 27, 1997

[54] SLURRY FORMING PROCESS USING AN INFLATABLE/COLLAPSIBLE BAG WITHIN A MIXING DEVICE

[75] Inventors: Chih-Chung Wang, Lexington; Kenneth R. Taylor, Norfolk, both of Mass.

[73] Assignee: Duracell Inc., Bethel, Conn.

[21] Appl. No.: 384,287

[22] Filed: Feb. 1, 1995

[51] Int. Cl.$^6$ ............................................. B01F 9/00
[52] U.S. Cl. ............................................. 366/208; 366/348
[58] Field of Search .......................... 366/1, 2, 6, 53, 366/54, 130, 208, 213, 218–220, 348, 349; 206/219, 221

[56] References Cited

U.S. PATENT DOCUMENTS

| | | |
|---|---|---|
| 2,617,775 | 11/1952 | Newberg et al. |
| 2,617,782 | 11/1952 | Paton et al. |
| 2,625,893 | 1/1953 | Semple . |
| 2,912,803 | 11/1959 | Simjian . |
| 3,030,081 | 4/1962 | Wilson et al. ............................ 366/348 |
| 3,132,846 | 5/1964 | Siddall ................................ 366/220 X |
| 3,819,107 | 6/1974 | Ryder, Jr. ............................. 206/219 |
| 4,711,582 | 12/1987 | Kennedy ............................... 366/279 |

FOREIGN PATENT DOCUMENTS

| | | | |
|---|---|---|---|
| 62-117621 | 5/1987 | Japan | 366/342 |
| 2181778 | 7/1990 | Japan | 366/349 |

*Primary Examiner*—Charles E. Cooley
*Attorney, Agent, or Firm*—Ronald S. Cornell; Robert J. Feltovic; Barry D. Josephs

[57] ABSTRACT

A method for the production of slurries which are uniform in density and consistency. In particular, a method for preparing zinc anode slurries employed in producing anodes for alkaline batteries. The method comprises a bag slurry forming process, using a drum mixer, involving mixing dry anode components within a sealed, inplated, gas-tight, liquid impervious, flexible, collapsible bag; and, then adding a wet component to the bag, collapsing said bag, and tumbling-kneading the components to form a blended slurry.

13 Claims, 1 Drawing Sheet

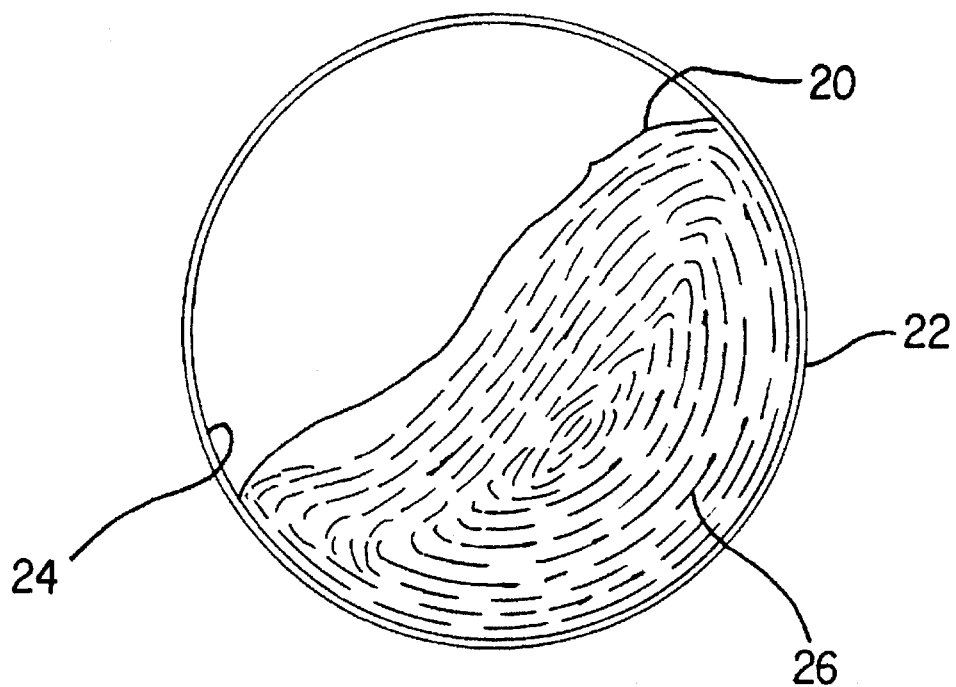
FIG. 1
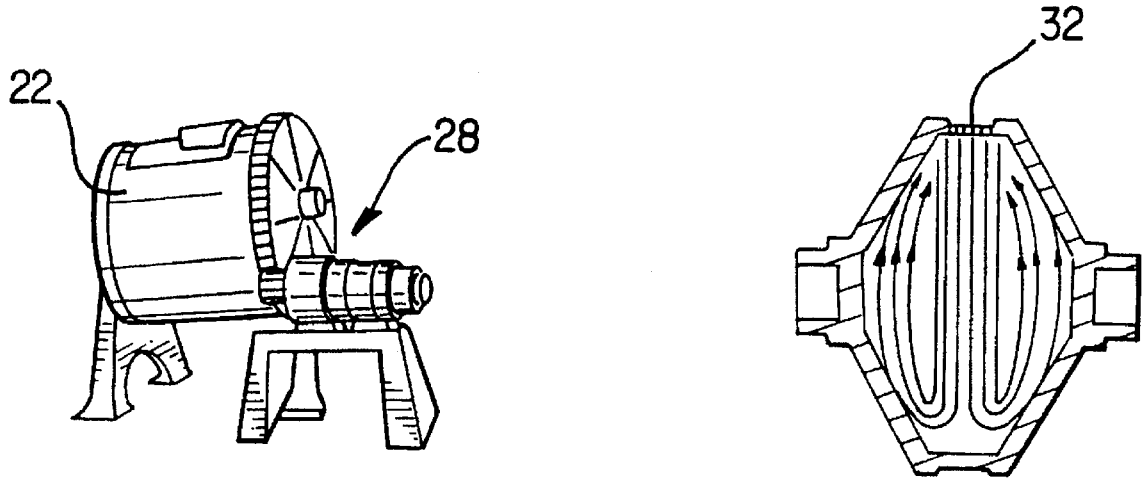
FIG. 2
FIG. 3

SLURRY FORMING PROCESS USING AN INFLATABLE/COLLAPSIBLE BAG WITHIN A MIXING DEVICE

The present invention relates to a method for the production of slurries, and, in particular is directed to a method for the production of slurries for electrodes which are utilized in electrochemical cells and, more particularly, pertains to a method of preparing zinc anode slurries employed in producing anodes for alkaline batteries.

Zinc anodes which are normally employed in alkaline batteries are generally produced through the formation of a slurry consisting of various active components. Such components include zinc powder, an electrolyte solution such as an aqueous solution of potassium hydroxide, and further anode components, such as surfactants and gellants. The slurry which is constituted from those components is ordinarily mixed in a blending apparatus and subsequently metered into the individual cells of the batteries to form the anodes thereof. A difficulty in the production of electrodes, such as the zinc anodes of the alkaline batteries, that often is encountered, is a lack uniformity from one battery electrode to another, and, consequently, from battery cell to cell. This inconsistency frequently adversely affects the operating characteristics and functioning of the resulting batteries. In the alkaline battery industry, which is a highly competitive and technologically developed field of activity, any significant or noticeable deviations in the physical and operating characteristics of a battery cannot be tolerated by a reputable manufacturer. One particular problem which causes lack of uniformity in the production of battery anodes resides in the undesirable inclusion of entrapped air bubbles in the electrode material, because of the presence of the bubbles in the slurry which is employed to form the anodes. The air bubbles cause variations in the density of the anode slurry, resulting in a lack of uniformity within the electrode structure itself. The foregoing results in inconsistent battery performance, directly proportional to the density of the anode material within each specific cell. Another problem which may cause deviations in the performance of the battery cells is the unwanted inclusion of contaminants in the anode composition, which often are introduced from contact of the anode components with the internal surfaces of the mixing device during blending of the anode slurry materials.

In order to address these problems, a primary effort in industry has been directed to the development of methods of producing electrochemical cells, particularly alkaline batteries utilizing zinc anodes, in an attempt to eliminate any contaminants and any entrapped air bubbles in the slurry which is employed for the production of the zinc battery anodes.

Previously, efforts have been exerted to avoid and/or eliminate the presence of entrapped or entrained air bubbles from an anode slurry through the employment of various blending or mixing devices. For example, one such attempt is the utilization of a mixing device such as a Ross blender, which mixes under vacuum so as to avoid entrapment of bubbles in the slurry during mixing. This attempt to evacuate the mixing chamber to effect the removal of entrained air or gas bubbles from the slurry is essentially rather complicated due to the need for the utilization of an evacuated system in conjunction with the operation of the blender mechanism. Although somewhat effective in eliminating air entrainment, this technique is frequently subject to undesirable ancillary effects, such as an uneven mixing of the constituents of the slurry. Consequently, anode slurries produced in this manner still do not possess the required uniform density and consistency and fail to completely eliminate, or even to reduce to a desirable extent, the presence of entrained air bubbles in the anode slurries. Moreover, in addition to the above-cited drawbacks of insufficient mixing action of the constituents of the slurry and low slurry density obtained due to entrapped air bubbles, there has also been encountered a problem of contamination of the anode material particularly from contact with the internal metallic surfaces of the mixer implements and walls.

Now, a slurry forming process has been developed, whereby improved density and/or lack of contamination can be accomplished. Pursuant to a preferred aspect of the invented slurry forming process, the components of a zinc anode composition, such as active zinc particles, aqueous potassium hydroxide electrolyte solution, and other components, such as gellants, surfactants, and other ingredients, are filled into a flexible container or bag, with the filled bag then being placed into a mixing device, preferably in the form of a driven rotatable rigid cylindrical container, through the intermediary of which the slurry mixing is to be effectuated. Preferably, the bag is made of a collapsible material, and, most preferably, a material that is gas-tight and liquid-impervious. Since all of the components are contained within the bag, there is no opportunity for direct contact between the components and the inside surfaces of the mixer device. Hence, the chance for contamination of the anode composition from the mixer is eliminated. The bag may be constructed of any suitable flexible, collapsible material; the use of plastic bags, such as polyethylene bags, has produced particularly favorable results.

It is preferred to mix the dry slurry components in a separate step prior to the addition of any wet slurry components. To accomplish the most effective mixing of dry ingredients, it is preferred to inflate the flexible bag containing the dry anode components, so that the bag will generally conform to the shape of the interior of the drum surface and allow the confined dry components freely to mix when the drum is rotated.

Pursuant to a particularly preferred embodiment of the invention, the flexible bag, within the rotatable drum, may then, optionally, be flushed with oxygen before the blending step with wet components added to the bag. In this manner, the bag will contain an atmosphere consisting essentially of oxygen rather than air; and, consequently, any gas which is entrapped in the slurry during subsequent wet mixing will be bubbles of oxygen rather than air. Entrapped oxygen, advantageously, will react with the zinc component contained in the slurry; the resultant zinc oxide formed by the zinc and oxygen is considered to be harmless to the performance of the alkaline battery cell. Zinc oxide is soluble in the potassium hydroxide which ordinarily is employed as an electrolyte slurry component, and also is an additive which heretofore has been purposefully added to the electrolyte. To accomplish the most effective slurry blending of the anode composition after the addition of wet components, such as the aqueous electrolyte solution, it is preferred to deflate and collapse the flexible bag before re-initiating mixing after the addition and sealing of a wet component within the bag. The wet and dry components within the collapsed bag undergo a kneading-type action, as the bag is tumbled within the rotating drum, to effect a uniformly blended slurry composition. Subsequent to the mixing of the slurry within the sealed bag, the mixed slurry then is transferred to an individual battery cell producing assembly.

In the embodiment wherein the atmosphere within the sealed bag is air, after completion of the mixing of the slurry, there will be, in all likelihood, some air bubbles remaining undissolved in the slurry. As cited above, this entrapped air can adversely affect the quality and consistency of the anode slurry. Consequently, through the intermediary of vacuum pumping arrangement, there can be carried out the transfer of the slurry in a manner intended to eliminate the presence of any residual air or gas bubbles encountered in the anode slurry pumped therethrough, so as to formulate a substantially deaerated slurry product of uniform density and consistency.

An important aspect of the invention also resides in the low cost and simplicity of the bag slurry forming process in comparison with the use of a conventional, evacuated blender. Such blenders necessitate a vacuum atmosphere be present during the mixing operation, and consequently are expensive pieces of equipment, rendering the slurry mixing process considerably more cost intensive. In accordance with the present invention, the need for specialized, vacuum blender equipment is avoided, thereby enabling the employment of less expensive and more efficient mixers, of widely varying types, for formulation of the slurry. According to the invention, a sealed liquid-impervious and gas-tight, flexible, collapsible bag containing the anode materials simply is placed in a rotatable vessel so as to be rotatable in conjunction therewith. In order to minimize transfer steps during the formulation and production of the anode slurry, it is possible to contemplate utilizing containers in which the raw materials for producing the slurry are directly supplied to the mixing bags.

Reference may now be had to the following detailed description of preferred embodiments of the slurry forming process of the invention, taken in conjunction with the accompanying drawings; in which:

FIG. 1 illustrates a diagrammatic cross-sectional view of a rotatable drum, containing a collapsed bag filled with slurry components, representing the kneading-mixing action between the slurry components;

FIG. 2 illustrates a perspective side view of a typical cylindrical batch mill utilized for the mixing of slurries; and FIG. 3 illustrates a diagrammatic sectional view of a conical batch mill drum unit employable for the mixing of slurries.

Referring to FIG. 1, pursuant to the inventive concept, there is contemplated the use of a flexible, collapsible container, such as a sealable gas-tight, liquid-impervious bag 20 containing slurry components 26, which when positioned in a rotatable container, such as a metallic cylindrical mixing drum 22, or the like, will eliminate the contact between the anode components and the interior surfaces of the metallic container.

The bag preferably may be inflated to conform to the inner shape of the drum during rotational mixing of the dry components. As illustrated in FIG. 1, after addition of wet components, the bag may be flushed with oxygen and collapsed to provide for an improved mixing action and so-called "kneading" of the slurry through the action of the flexible or movable walls of the bag 20 which are displaced towards and away from the drum wall inner surface 24 during tumbling and rotation. This enhanced mixing action of the slurry components, with the concurrent elimination of entrapped air through the alternative use of oxygen to replace the atmospheric medium in the rotatable bag 20, accomplishes a uniform slurry while avoiding the formation of unwanted entrapped air or gas bubbles in the slurry.

In practicing the present invention, the flexible bag 20 is filled with slurry components, and the bag, with the contents thereof, is positioned in the rotatable drum 22, as shown in either FIG. 1 or as part of batch mill 28 in FIG. 2. The rotatable drum is then tilted into a substantially horizontal or slightly tilted therefrom position, as shown in FIG. 2. The drum and contained bag then are rotated in a motor driven mode and tumbled for a specified period of time, in conformance with the requirements of the slurry mixing process, to knead the wet and dry anode components to form a thoroughly blended slurry. Thereafter, the drum 22, including the sealed bag 20 containing the admixed or blended slurry, may be upended through suitable hoisting means and transported on a cut-away dolly or other suitable transport vehicle to a battery cell assembly. Alternatively, if it is necessary, the slurry may be transported first to a vacuum pumping installation for further elimination of any entrained air or gas bubbles, so as to densify and deaerate the slurry to a desired consistency prior to being transferred to the battery cell assembly.

As demonstrated by FIG. 3, various conventional mixers may be utilized in practicing the present invention. For example, rather than being cylindrically configured, the mixing drum, containing the bag, may be a conical batch mill 32, which is rotatable about a horizontal axis to provide for the slurry mixing action as illustrated by the arrows shown therein. The various cylindrical or conical batch mill drums, and the like, may also be mounted on transport vehicles or dollies so as to enable the displacement and positioning thereof in an operative relationship with a battery cell assembly, or, if necessary, with a vacuum pumping assembly as mentioned hereinabove, thereby obviating the necessity for the provision of further slurry transport devices.

As set forth herein, the slurry for forming the zinc anodes for alkaline battery cells may have the following components, shown in appropriate weight fractions as illustrated in Table 1 hereinbelow.

TABLE 1

| Additive | Weight Fraction (%) |
| --- | --- |
| Zinc | 65.0 |
| Surfactant Solution | 0.2 |
| Gellant | 0.8 |
| Electrolyte | 34.0 |

In essence, by way of example, a bag slurry forming process may constitute the following general steps:

1. Dry Plating—Add zinc powder to a polymer mixing bag. Inflate and seal the bag and tumble for 10 minutes.
2. Fluxing—Add surfactant solution. Inflate and seal the bag and tumble for 10 minutes.
3. Dry Mixing—Add gellant. Inflate and seal the bag and tumble for 10 minutes.
4. Wet Mixing—Add electrolyte to dry mix. Remove excess atmosphere to collapse the bag (and, optionally, flush the bag contents with oxygen), seal, and tumble for 60 minutes.
5. Vacuum Pumping (optional)—A portion of the slurry is sparged into an evacuated chamber, where entrapped air bubbles are removed, thereby producing a more uniform slurry. When the bag is back-filled with oxygen rather than containing air, Step 5 (Vacuum Pumping) may not be necessary.

Results of tests with regard to the slurry formulations and mixing using the present technique rather than with a Ross blender showed a dramatic improvement in uniform characteristics and density consistency. In addition, slurry formulations processed in an air atmosphere, according to the present invention, thereafter followed by vacuum pumping to remove entrained air bubbles, exhibited improved density characteristics and a visible reduction in air entrapment compared to production slurries normally produced in the Ross-type blender. In essence, pursuant to the invention there are obtained improvements in slurry characteristics and processability, which can be readily ascribed to the improved method of formulating the slurry through the bag slurry manufacturing process.

While there has been shown and described what are considered to be preferred embodiments of the invention, it will, of course, be understood that various modifications and changes in form or detail could readily be made without departing from the spirit and scope of the invention. It is, therefore, intended that the invention be not limited to the exact form and detail herein shown and described, nor to anything less than the whole of the invention herein disclosed as hereinafter claimed.

What is claimed is:

1. A method of forming a slurry of selected dry and wet component comprising:

introducing selected dry slurry components into a flexible, collapsible bag;

inflating and sealing said bag to confine said components therein;

agitating the sealed bag within a mixing device, so as to blend the confined components;

opening said bag and introducing a wet slurry component into said bag;

collapsing said bag and resealing the bag to confine the wet and dry components therein; and, operating the mixing device to knead and blend the confined components into a slurry composition.

2. The method of claim 1 wherein said mixing device is a rotating drum mixer.

3. A method of forming a slurry of select dry and wet components comprising:

introducing the dry and wet components into a flexible, collapsible bag;

collapsing said bag and sealing the bag to confine the components therein;

placing the collapsed bag within a mixing device; and, activating said mixing device to agitate said bag, so as to knead and blend the confined components into a slurry composition.

4. The method of claim 3 wherein said bag is a gas-tight, liquid-impervious bag.

5. The method of claim 3 wherein said mixing device is a rotating drum mixer.

6. A method of forming a slurry in a rotating drum mixer comprising:

introducing dry slurry components into a flexible, collapsible bag;

placing said bag within a rotatable drum of the drum mixer;

inflating said bag and sealing the bag to confine the components therein;

rotating the drum to mix the dry components;

opening said bag and introducing a wet slurry component into said bag;

collapsing said bag and sealing the bag to confine the wet and dry components therein; and, rotating the drum to agitate and tumble said bag, so as to knead and blend the confined components into a slurry composition.

7. The method of claim 6 wherein said bag is a gas-tight, liquid-impervious bag.

8. The method of claim 6 wherein said bag is inflated with air to conform said bag to the shape of the drum interior surface before it is sealed and the drum is rotated to mix the confined components.

9. The method of claim 6 wherein, after introducing a wet slurry component into the bag, said bag is flushed with oxygen before said bag is collapsed and the drum is rotated to blend the confined wet and dry components into a slurry.

10. The method of claim 6 wherein the dry and wet components blended to form a slurry composition are dry and wet anode components.

11. The method of claim 10 wherein dry anode components comprising zinc powder, a gellant, and a fluxing agent are first mixed in the bag; and a wet slurry component comprising an electrolyte solution then is introduced into said bag and the confined components are kneaded and blended to form a battery anode slurry composition.

12. The method of claim 6 comprising:

after rotating the drum to mix the dry components therein, opening said bag and introducing at least one additional dry component into the bag;

sealing the bag to confine the components therein; and, rotating the drum to mix the confined dry components.

13. The method of claim 12 comprising:

introducing dry slurry components comprising zinc powder and fluxing agent into said bag;

inflating said bag;

rotating the drum to mix the zinc powder and fluxing agent;

opening said bag and introducing at least one additional dry component comprising a gellant into said bag;

sealing the bag to confine the components therein;

rotating the drum to mix the confined components;

opening said bag and introducing a wet slurry component comprising an electrolyte solution into said bag;

collapsing said bag; and, rotating the drum to knead and blend the components into a slurry composition.

* * * * *